United States Patent
Kim et al.

(10) Patent No.: US 8,780,833 B2
(45) Date of Patent: Jul. 15, 2014

(54) CONTROL CHANNEL MONITORING APPARATUS IN MULTI-CARRIER SYSTEM AND METHOD THEREOF

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 198 days.

(21) Appl. No.: 13/202,723

(22) PCT Filed: Feb. 23, 2010

(86) PCT No.: PCT/KR2010/001121
§ 371 (c)(1),
(2), (4) Date: Sep. 23, 2011

(87) PCT Pub. No.: WO2010/095913
PCT Pub. Date: Aug. 26, 2010

(65) Prior Publication Data
US 2012/0044821 A1 Feb. 23, 2012

Related U.S. Application Data

(60) Provisional application No. 61/154,437, filed on Feb. 23, 2009, provisional application No. 61/171,064, filed on Apr. 20, 2009.

(51) Int. Cl.
*H04W 4/00* (2009.01)
(52) U.S. Cl.
USPC .......................................... 370/329

(58) Field of Classification Search
USPC ........................................ 370/252
See application file for complete search history.

(56) References Cited

U.S. PATENT DOCUMENTS

| | | | |
|---|---|---|---|
| 8,238,475 B2 * | 8/2012 | Malladi et al. | 375/316 |
| 2003/0152044 A1 | 8/2003 | Turner | |
| 2005/0053031 A1 * | 3/2005 | Holtzman et al. | 370/328 |
| 2010/0182968 A1 * | 7/2010 | Ojala et al. | 370/329 |
| 2010/0195583 A1 * | 8/2010 | Nory et al. | 370/329 |
| 2010/0232373 A1 * | 9/2010 | Nory et al. | 370/329 |
| 2010/0303011 A1 * | 12/2010 | Pan et al. | 370/328 |
| 2011/0274066 A1 * | 11/2011 | Tee et al. | 370/329 |
| 2012/0106569 A1 * | 5/2012 | Che et al. | 370/437 |
| 2013/0195039 A1 * | 8/2013 | Pan et al. | 370/329 |

FOREIGN PATENT DOCUMENTS

| | | |
|---|---|---|
| KR | 2001-0028766 A | 4/2001 |
| KR | 10-2004-0106467 A | 12/2004 |
| WO | WO 03/094559 A2 | 11/2003 |

* cited by examiner

*Primary Examiner* — Suk Jin Kang
(74) *Attorney, Agent, or Firm* — Birch, Stewart, Kolasch & Birch, LLP

(57) ABSTRACT

The present invention relates to a method for monitoring a control channel and an apparatus thereof. A reference carrier is set, and then the multi-carrier sends blind decoding area information based on the reference carrier to monitor a control channel. A terminal monitors the control channel based on the blind decoding area information. The terminal performs blind decoding only for a component carrier required, and thus reduces power consumption and reception complexity.

18 Claims, 21 Drawing Sheets

CONTROL CHANNEL MONITORING APPARATUS IN MULTI-CARRIER SYSTEM AND METHOD THEREOF

CROSS REFERENCE TO RELATED APPLICATIONS

This application is the National Phase of PCT/KR2010/001121 filed on Feb. 23, 2010, which claims priority under 35 U.S.C. 119(e) to U.S. Provisional Application Nos. 61/154,437 filed on Feb. 23, 2009 and 61/171,064 filed Apr. 20, 2009, all of which are hereby expressly incorporated by reference into the present application.

TECHNICAL FIELD

The present invention relates to wireless communication and, more particularly, to an apparatus and method supporting multiple carriers.

BACKGROUND ART

A wireless communication system has been extensively developed to provide various types of communication services such as a voice, data, and the like. In general, a wireless communication system is a multi-access system supporting communication between multiple users by sharing available system resources (bandwidth, transmission power, and the like). Examples of multi-access systems include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, and the like.

A general wireless communication system largely considers only a single carrier although bandwidths for uplink and downlink are set to be different. A carrier is defined by a center frequency and a bandwidth. A multi-carrier system uses a plurality of carriers having a bandwidth smaller than an overall bandwidth.

3GPP LTE (long term evolution) based on 3GPP (3rd Generation Partnership Project) TS (Technical Specification) Release 8 is a potential next-generation mobile communication standard.

The 3GPP LTE system supports only one bandwidth (i.e., one carrier) among {1.4, 3.5.10, 15, 20}MHz. In order to support an overall bandwidth of 40 MHz, a multi-carrier system uses two carriers each having 20 MHz bandwidth, or uses three carriers having 20 MHz bandwidth, 15 MHz bandwidth, and 5 MHz bandwidth, respectively.

The multi-carrier system can guarantee lower backward compatibility with an existing system and highly enhance a data rate through multiple carriers.

In the single carrier system, a control channel and a data channel are designed based on a single carrier. Here, the use of an existing channel structure as it is in multiple carriers in order to maintain compatibility with the single carrier system will possibly be ineffective.

Thus, a channel structure that is able to support the multi-carrier system is required.

DISCLOSURE

Technical Problem

An aspect of the present invention provides an apparatus and method for supporting multiple carriers.

Another aspect of the present invention provides an apparatus and method for monitoring a control channel in a multi-carrier system.

Another aspect of the present invention provides an apparatus and method for transmitting a control channel in a multi-carrier system.

Technical Solution

In an aspect, a method for monitoring a control channel in a multi-carrier system is provided. The method includes configuring a reference carrier, receiving blind decoding zone information through the reference carrier to monitor a control channel on multiple carriers, and monitoring a control channel based on the blind decoding zone information.

The blind decoding zone information may include information regarding a monitored component carrier for monitoring a control channel among a plurality of component carriers.

The blind decoding zone information may include monitoring information for performing blind decoding on the monitored component carrier.

The monitoring information may include at least any one of a control channel elements (CCE) aggregation level in a search space, the number of candidate physical downlink control channels (PDCCHs) at each CCE aggregation level, and a starting point of the search space.

The monitoring information may include information for performing blind decoding in the reference carrier.

The blind decoding zone information may include information regarding an area in which a control channel is monitored within a subframe.

The blind decoding zone information may include information regarding the size of the area in which the control channel is monitored within the subframe.

The blind decoding zone information may be transmitted by using a predetermines resource within the subframe.

The blind decoding zone information may be received by using blind decoding.

In another aspect, a user equipment (UE) for monitoring a control channel in a multi-carrier system is provided. The UE includes an RF unit for transmitting and receiving a radio signal, and a processor operatively connected with the RF unit and configured to configure a reference carrier, receive blind decoding zone information through the reference carrier to monitor a control channel on multiple carriers, and monitor a control channel based on the blind decoding zone information.

Advantageous Effects

Since the UE can perform blind decoding only on a required component carrier, power consumption and reception complexity can be reduced.

MODE FOR INVENTION

Figure 1:
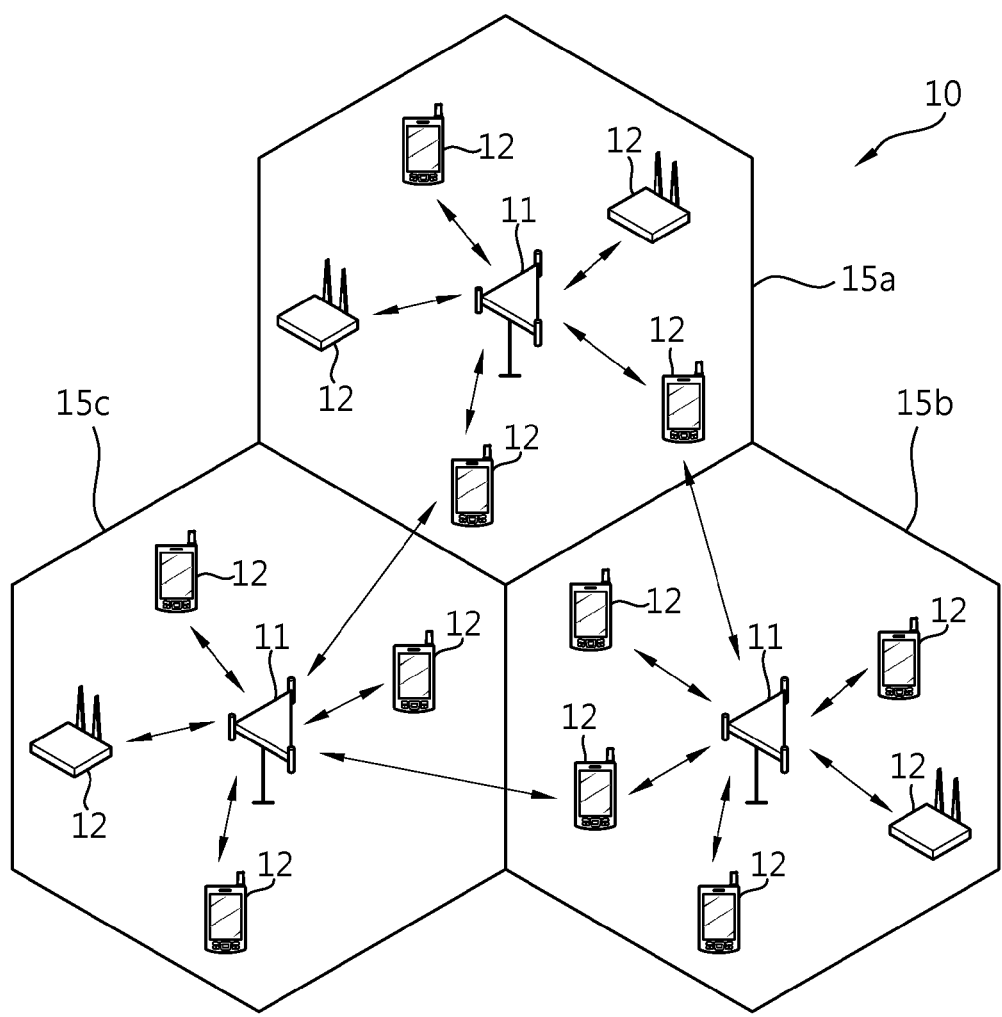
FIG. 1 is a view showing a wireless communication system.

FIG. 1 shows a wireless communication system. A wireless communication system 10 includes one or more base stations (BSs) 11. The BSs 11 provide communication services to particular geographical areas (which are generally called 'cells') 15a, 15b, and 15c. Each of the cells can be divided into a number of areas (which are also called 'sectors').

A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device, or the like.

In general, the BS 11 refers to a fixed station that communicates with the UEs 12, and it may be referred to by other names such as evolved-NodeB (eNB), base transceiver system (BTS), access point, or the like.

Hereinafter, downlink (DL) refers to communication from the BS to the UE, and uplink (UL) refers to communication from the UE to the BS. In downlink, a transmitter may be part of the BS and a receiver may be part of the UE. In uplink, a transmitter may be part of the UE and a receiver may be part of the BS.

Figure 2:
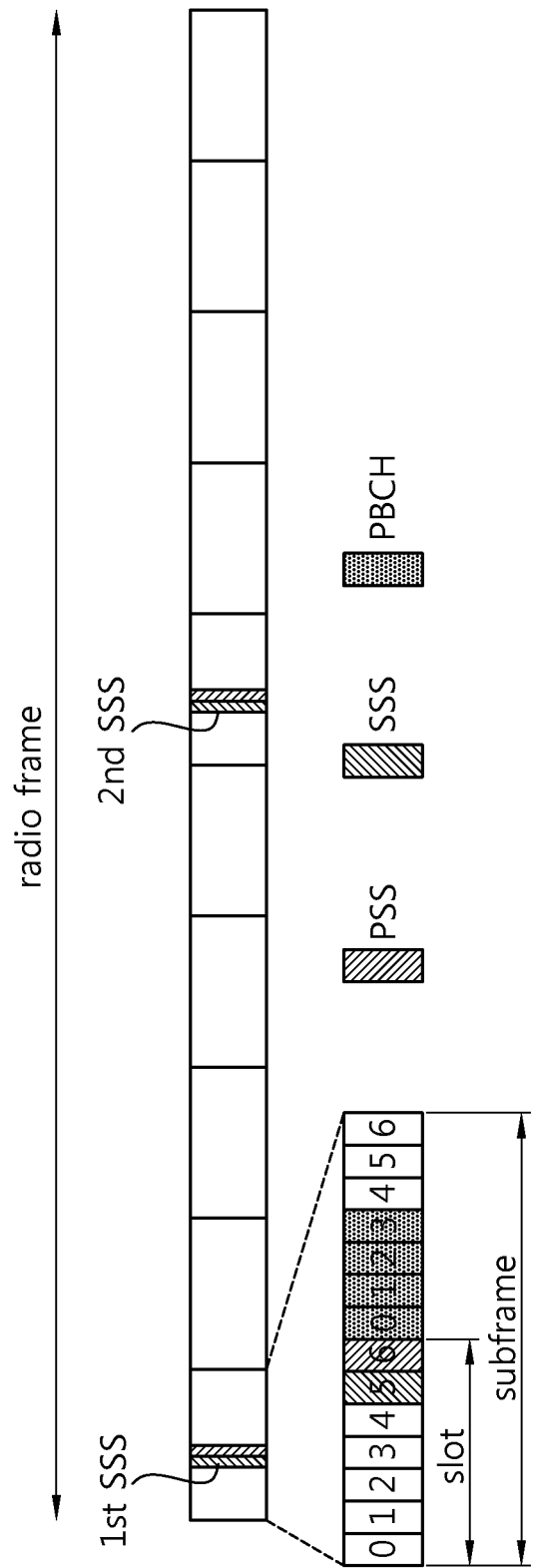
FIG. 2 is a view showing the structure of a radio frame in 3GPP LTE.

FIG. 2 shows the structure of a radio frame in 3GPP LTE. This may refer to paragraph 6 of 3GPP TS 36.211 V8.5.0 (2008-12). A radio frame is comprised of ten subframes indexed by 0 to 9, and one subframe is comprised of two slots. A time required for transmitting one subframe is called a TTI (transmission time interval). For example, the length of one subframe may be 1 ms, and the length of one slot may be 0.5 ms.

One slot may include a plurality of OFDM (orthogonal frequency division multiplexing) symbols in a time domain. Since 3GPP LTE uses OFDMA in downlink, OFDM symbols are used to express one symbol period, which may be called by other name. For example, when SC-FDMA is used as an uplink multi-access scheme, it may be called an SC-FDMA symbol.

It is exemplarily described that one slot includes seven OFDM symbols, but the number of OFDM symbols included in one slot may vary according to the length of a CP (Cyclic Prefix). According to 3GPP TS 36.211, in a normal CP, one subframe includes seven OFDM symbols, and in an extended CP, one subframe includes six OFDM symbols.

A PSS (Primary Synchronization Signal) is transmitted in the last OFDM symbol of the first slot (i.e., the first slot of the first subframe (a subframe having an index 0)) and the $11^{th}$ slot (i.e., the first slot of the sixth subframe (a subframe having an index 5). The PSS is used to obtain an OFDM symbol synchronization or slot synchronization, and is related to a physical cell ID (Identity). A PSC (Primary Synchronization Code) is a sequence used for the PSS, and the 3GPP LTE has three PSCs. One of the three PSCs is transmitted in the PSS according to a cell ID. The same PSC is used in the last OFDM symbols of the first slot and the $11^{th}$ slot.

An SSS (Secondary Synchronization Signal) includes a first SSS and a second SSS. The first SSS and the second SSS are transmitted in OFDM symbols adjacent to the OFDM symbols in which the PSS is transmitted. The SSS is used to obtain frame synchronization. The SSS is used to obtain a cell ID along with the PSS. The first SSS and the second SSS use mutually different SSCs (Secondary Synchronization Codes). When the first SSS and the second SSS include 31 subcarriers, respectively, a sequence of each of two SSCs each having a length of 31 is used for the first SSS and the second SSS, respectively.

A PBCH (Physical Broadcast Channel) is transmitted in front four OFDM symbols of the second slot of the first subframe. The PBCH carries system information essential for the UE to communicate with the BS, and system information transmitted via the PBCH is called a MIB (master information block). In comparison, system information transmitted via a PDCCH (physical downlink control channel) is called an SIB (system information block).

As disclosed in 3GPP TS 36.211 V8.5.0 (2008-12) "Evolved Universal Terrestrial Radio Access (E-UTRA); Physical Channels and Modulation (Release 8)", in LTE, physical channels are divided into a PDSCH (Physical Downlink Shared Channel), and a PUSCH (Physical Uplink Shared Channel), data channels, and a PDSCH (Physical Downlink Control Channel) and a PUCCH (Physical Uplink Control Channel), control channels. Also, downlink control channels include a PCFICH (Physical Control Format Indicator Channel) and a PHICH (Physical Hybrid-ARQ Indicator Channel).

Figure 3:
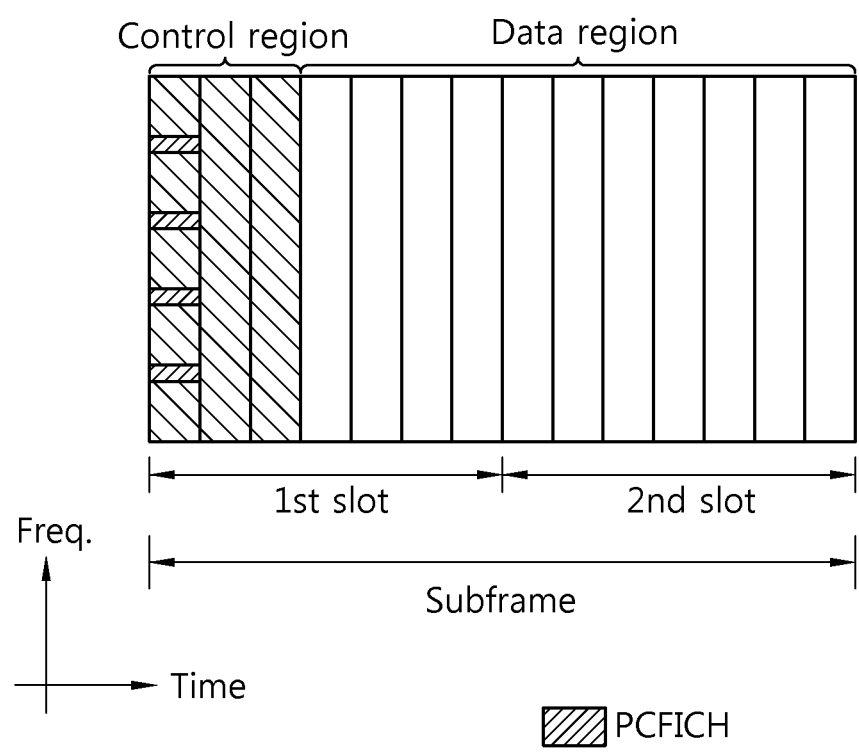
FIG. 3 is a view showing the structure of a downlink subframe in 3GPP LTE.

FIG. 3 shows the structure of a downlink subframe in 3GPP LTE. The subframe is divided into a control region and a data region in the time domain. The control region includes maximum three OFDM symbols of the first slot in the subframe, but the number of OFDM symbols included in the control region may vary. The PDCCH is allocated to the control region, and the PDSCH is allocated to the data region.

The PCFICH transmitted in the first OFDM symbol of the subframe carries information regarding the number of OFDM symbols (i.e., the size of the control region0 used in transmitting control channels within the subframe.

The PHICH carries an ACK (Acknowledgement)/NACK (Not-Acknowledgement) with respect to an uplink HARQ (Hybrid Automatic Repeat Request). Namely, an ACK/NACK signal with respect to uplink data transmitted by the UE is transmitted on the PHICH.

Control information transmitted via the DCCH is called downlink control information (DCI). It may include a resource allocation (or resource assignment) of the DCI PDSCH (which is also called downlink grant), a resource allocation of the PUSCH (which is also called uplink grant), a set of transmission power control commands with respect to individual UEs of a certain UE group and/or an activation of VoIP (Voice over Internet Protocol).

Figure 4:
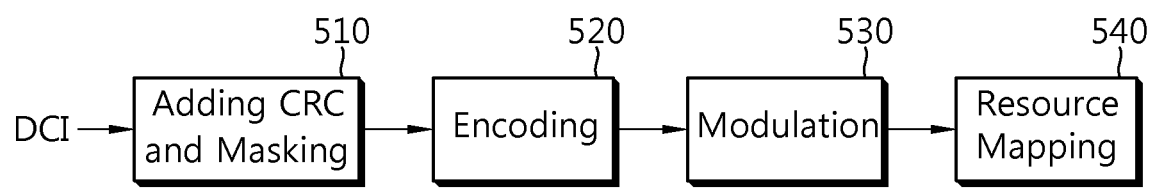
FIG. 4 is a schematic block diagram showing the configuration of a PDCCH.

FIG. 4 is a schematic block diagram showing the configuration of a PDCCH. After the BS determines a PDCCH format according to the DCI intended to be transmitted to the UE, it attaches a CRC (Cyclic Redundancy Check) to the DCI and masks a unique identifier (which is called an RNTI (Radio Network Temporary Identifier)) to the CRC according to the owner or the purpose of the PDCCH (block 510).

When the PDCCH is a PDCCH for a particular UE, a unique identifier of the UE, e.g., a C-RNTI (Cell-RNTI), may be masked on the CRC. Or, when the PDCCH is a PDCCH for a paging message, a paging indication identifier, e.g., a P-RNTI (Paging-RNTI), may be masked on the CRC. When the PDCCH is a PDCCH for system information, a system information identifier, e.g., an SI-RNTI (system information-RNTI), may be masked on the CRC. In order to indicate a random access response, a response to a transmission of a random access preamble of the UE, an RA-RNTI (random access-RNTI) may be masked on the CRC.

When the C-RNTI is used, the PDCCH carries control information (which is called UE-specific control information) for a particular UE, and when a different RNTI is used, the PDCCH carries common control information received by every terminal or a plurality of terminals within the cell.

The CRC-added DCI is encoded to generate coded data (block 520). Encoding includes channel encoding and rate matching.

The coded data is modulated to generate modulated symbols (block 530).

The modulated symbols are mapped to physical Res (block 540). Each of the modulated symbols is mapped to each of the REs.

Figure 5:
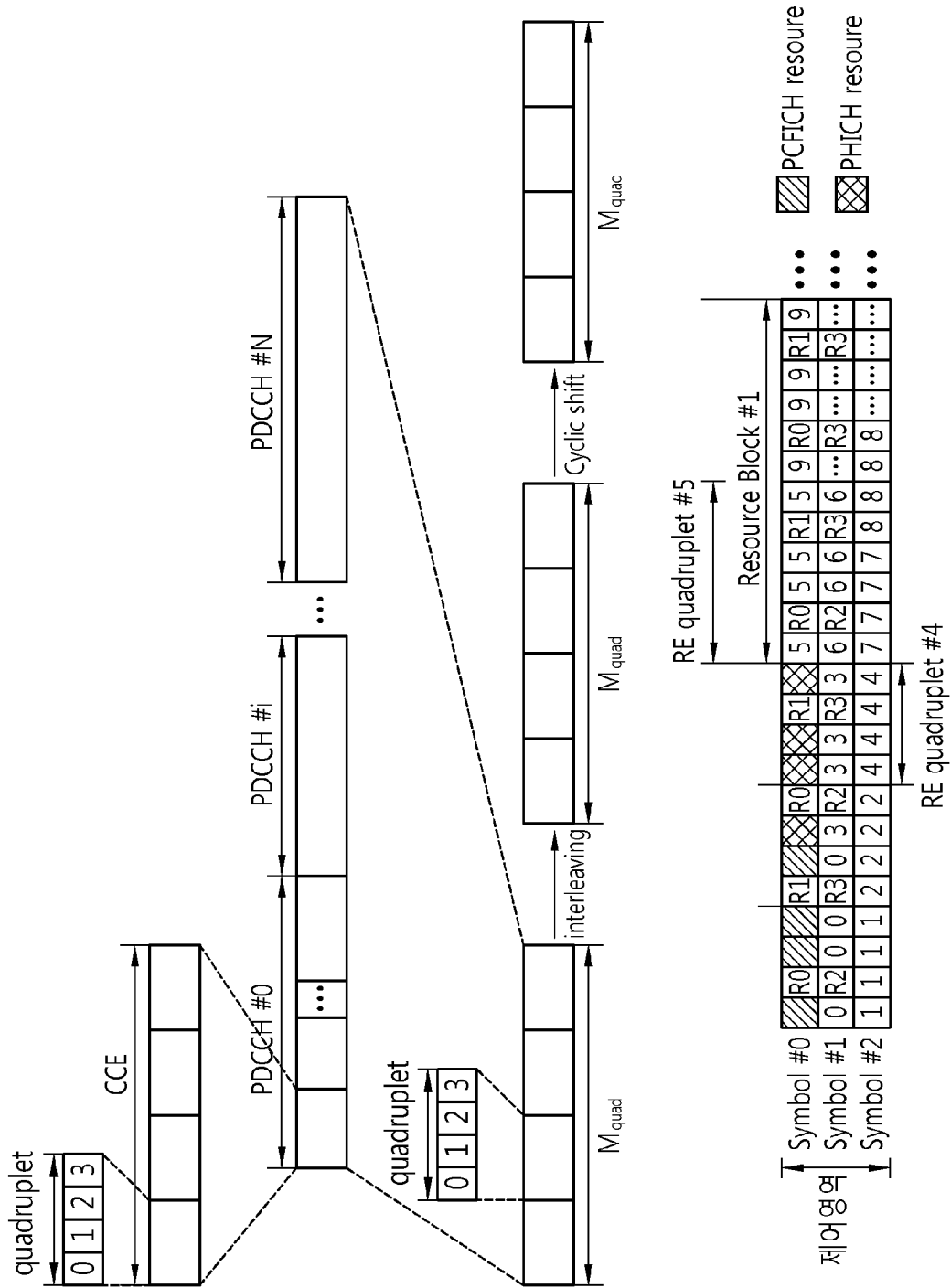
FIG. 5 is a view showing an example of resource mapping of the PDCCH.

FIG. 5 is a view showing an example of resource mapping of the PDCCH. This may refer to Paragraph 6.8 of 3GPP TS 36.211 V8.5.0 (2008-12). R0 indicates a reference signal of a first antenna, R1 indicates a reference signal of a second antenna, R2 indicates a reference signal of a third antenna, and R3 indicates a reference signal of a fourth antenna.

The control region of the subframe includes a plurality of CCEs (control channel elements). The CCE is a logical allocation unit used to provide a coding rate according to a state of a radio channel to the PDCCH. The CCEs correspond to a plurality of REGs (resource element groups). The format of the PDCCH and the number of bits of the PDCCH are determined according to correlation between the number of CCEs and the coding rate provided by the CCEs.

One REG (which is indicated as quadruplet in the drawing) includes four Res, and one CCE includes 9 REGs. In order to configure one PDCCH, {1, 2, 4, 8} number of CCEs may be used, and here, {1, 2, 4, 8} is called a CCE aggregation level.

A control channel comprised of one or more CCEs performs interleaving by REG, and after a cyclic shift based on a cell ID (Identifier) is performed, the control channel is mapped to physical resource.

Figure 6:
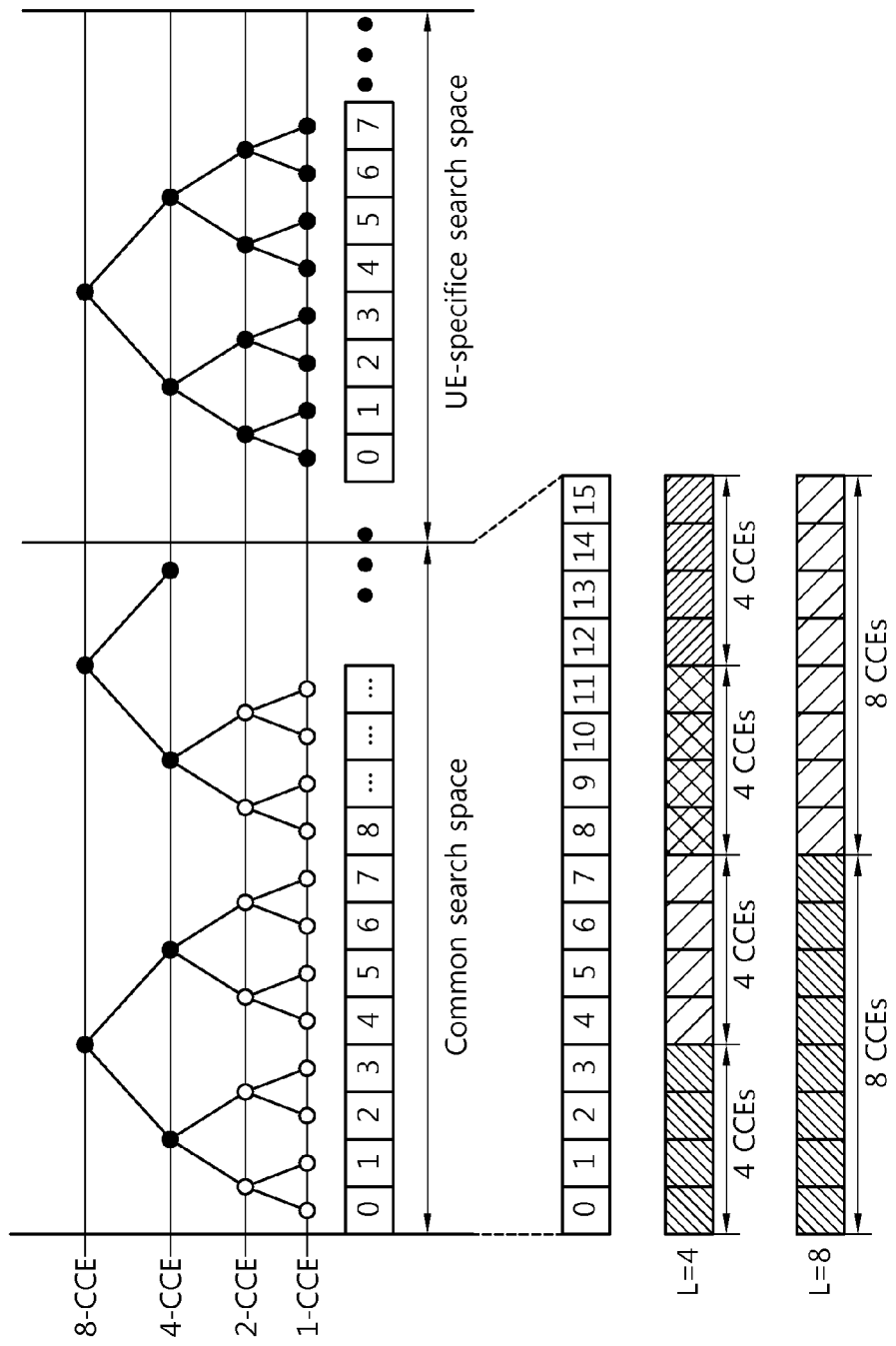
FIG. 6 is a view showing monitoring of the PDCCH.

FIG. 6 is a view showing monitoring of the PDCCH. This may refer to Paragraph 9 of 3GPP TS 36.213 V8.5.0 (2008-12). In 3GPP LTE, blind decoding is used to detect the PDCCH. Blind decoding is a method for demasking a desired identifier on a CRC of a received PDCCH (which is called a candidate PDCCH) to check a CRC error to determine whether or not the corresponding PDCCH is its control channel. The UE cannot know about at which position in the control region its PDCCH is transmitted by using which CCEE aggregation level or DCI format.

A plurality of PDCCHs may be transmitted in one subframe. The UE monitors a plurality of PDCCHs at every subframe. Here, monitoring refers to attempting, by the UE, to decode the PDCCH according to the monitored PDCCH format.

In 3GPP LTE, in order to reduce the burden due to the blind decoding, a search space is used. The search space may be a monitoring set of the CCD for the PDCCH. The UE monitors the PDCCH within a corresponding search space.

The search space can be classified into a common search space and a UE-specific search space. The common search space is a space for searching for a PDCCH having common control information. The common search space is comprised 16 CCEs of CCE indexes 1 to 15 and supports a PDCCH having a CCE aggregation level of {4, 8}. The UE-specific search space supports a PDCCH having a CCE aggregation level of {1, 2, 4, 8}.

A multi-carrier system will now be described.

The 3GPP LTE system supports a case in which a downlink bandwidth and an uplink bandwidth are differently set, but it is on the premise of one component carrier. This means that the 3GPP LTE supports only a case in which the downlink bandwidth and the uplink bandwidth are identical or different in a situation in which one component carrier is defined for uplink and downlink, respectively. For example, the 3GPP LTE system supports a maximum of 20 MHz, and supports only one component carrier in uplink and downlink although the uplink bandwidth and downlink bandwidth may be different.

A spectrum aggregation (or bandwidth aggregation or a carrier aggregation (CA)) supports a plurality of carriers. The spectrum aggregation has been introduced to support increased throughput, prevent an increase in cost otherwise caused by an introduction of a broadband radio frequency (RF) element, and guarantee compatibility with an existing system. For example, when five component carriers are allocated as granularity of carrier unit having a 20 MHz bandwidth, a maximum 100 MHz bandwidth can be supported.

The spectrum aggregation is divided into a contiguous spectrum aggregation in which aggregation is made by continuous carriers in the frequency domain and a non-contiguous spectrum aggregation in which aggregation is made discontinuous carriers. The number of aggregated carriers may be set to be different for downlink and uplink. An aggregation in which the number of downlink component carriers is equal to the number of uplink component carriers is called a symmetric aggregation, and an aggregation in which the number of downlink component carriers is different from the number of uplink component carriers is called an asymmetric aggregation.

Sizes (i.e., bandwidths) of component carriers may vary. For example, when five component carriers are used to configure a 70 MHz band, the five carriers may be configured as follows: 5 MHz CC (carrier #0)+20 MHz CC (carrier #1)+20 MHz CC (carrier #2)+20 MHz CC (carrier #3)+5 MHz CC (carrier #4).

Hereinafter, a multi-carrier system refers to a system supporting multiple carriers based on the spectrum aggregation. In the multi-carrier system, a contiguous carrier aggregation and/or a non-contiguous carrier aggregation may be used, or either the symmetrical aggregation or the asymmetrical aggregation may be used.

At least one or more MAC (Medium Access Control) entities may manage/operate one or more component carriers and perform transmission and reception. The MAC entity has an upper layer of a physical layer (PHY) in a radio interface protocol. For example, in the MAC entity, a MAC layer and/or its upper layer may be implemented.

Figure 7:
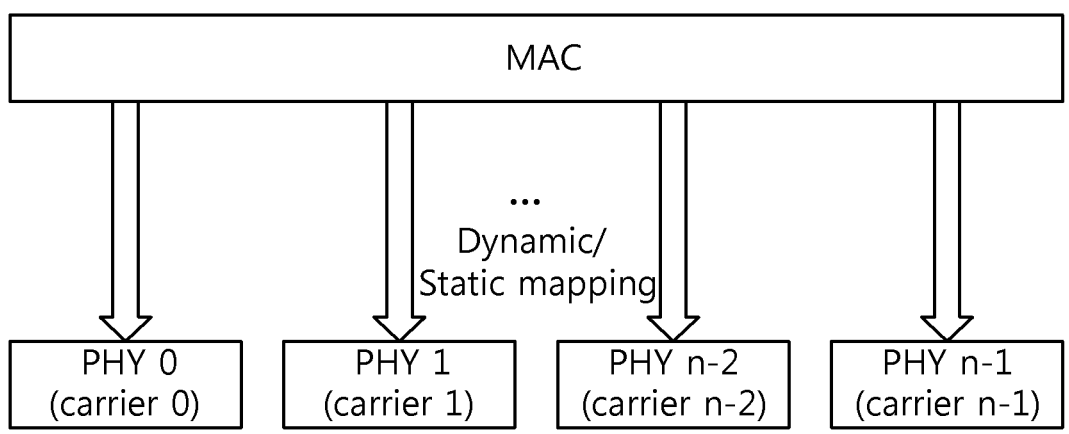
FIG. 7 is a view showing an example of a transmitter in which one MAC manages multiple carriers.
Figure 8:
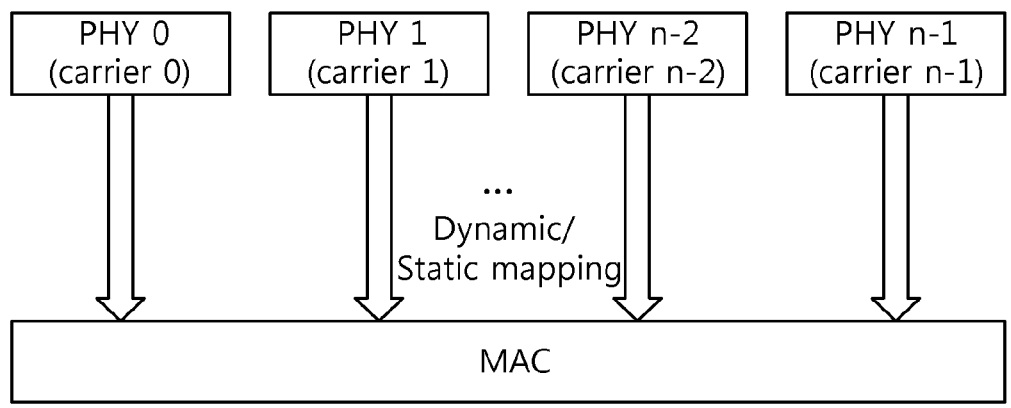
FIG. 8 is a view showing an example of a receiver in which one MAC manages multiple carriers.

FIG. 7 is a view showing an example of a transmitter in which one MAC manages multiple carriers. FIG. 8 is a view showing an example of a receiver in which one MAC manages multiple carriers. One physical layer (PHY) corresponds to one carrier, and a plurality of physical layers (PHY 0, . . . , PHY n−1) are managed by one MAC. Mapping between the MAC and the plurality of physical layers (PHY 0, . . . , PHY n−1) may be dynamically or statically made.

When one MAC manages multiple carriers, the respective component carriers are not required to be contiguous, having advantages in that resource management is flexible.

Figure 9:
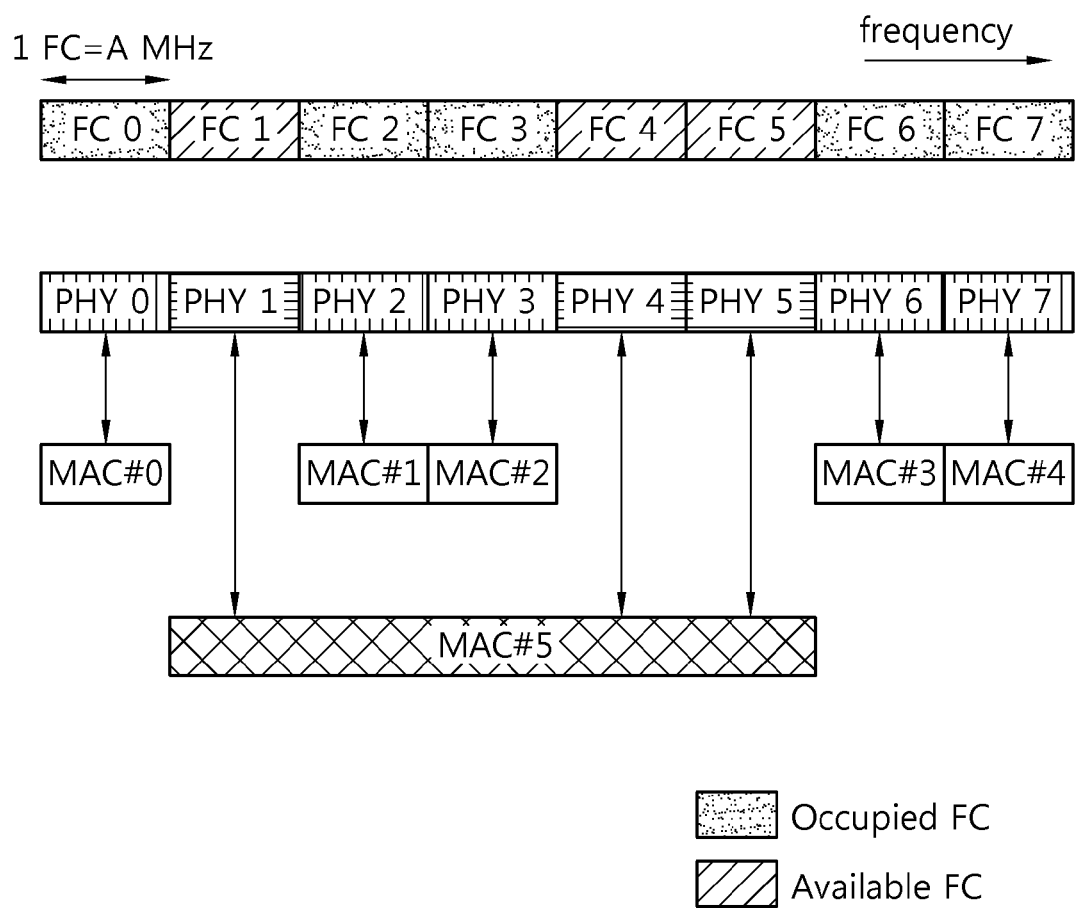
FIG. 9 is a view showing an example of managing multiple carriers.

FIG. 9 is a view showing an example of managing multiple carriers. One frequency carrier corresponds to one component carrier, and one component carrier corresponds to one PHY. In the present embodiment, FC 1, FC 4, and FC 5 correspond to PHY 1, PHY 4, and PHY 5, respectively. PHY 1, PHY 4, and PHY 5 are managed by one MAC #5. FCs managed by one MAC may not be contiguous, so resources can be effectively utilized.

In the present embodiment, it appears that the indexes of the FCs and those of the corresponding PHYs are directly mapped, but there is no limitation in the relationship between the indexes of the FC and the indexes of the PHYs.

Figure 10:
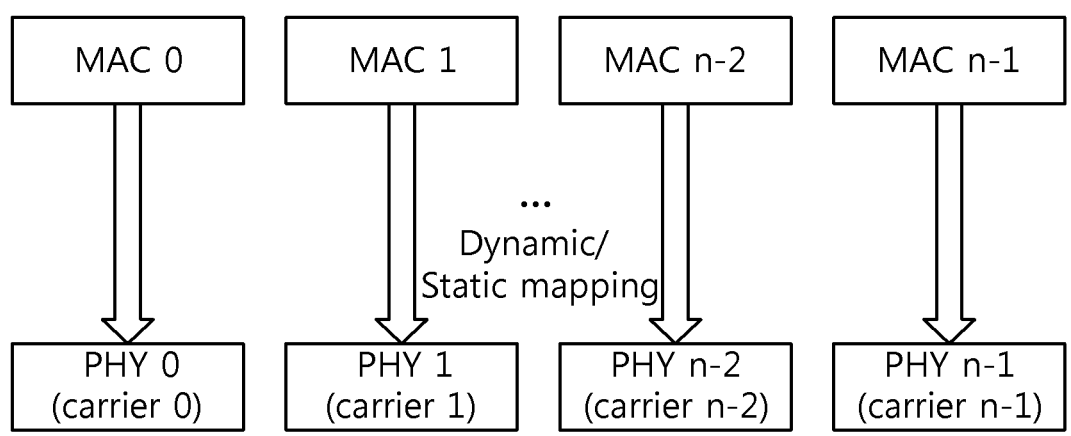
FIG. 10 is a view showing another example of a transmitter in which multiple MACs manage multiple carriers.
Figure 11:
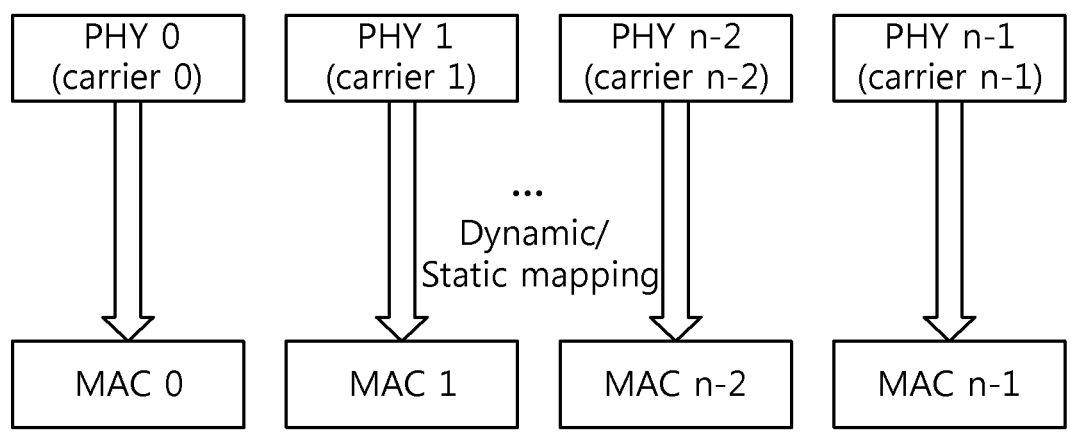
FIG. 11 is a view showing another example of a receiver in which multiple MACs manage multiple carriers.

FIG. 10 is a view showing another example of a transmitter in which multiple MACs manage multiple carriers, and FIG. 11 is a view showing another example of a receiver in which multiple MACs manage multiple carriers. Unlike the embodiments of FIGS. 7 and 8, a plurality of MACs (MAC 0, . . . , MAC n−1) are mapped to a plurality of physical layers (PHY 0, . . . , PHY n−1).

Figure 12:
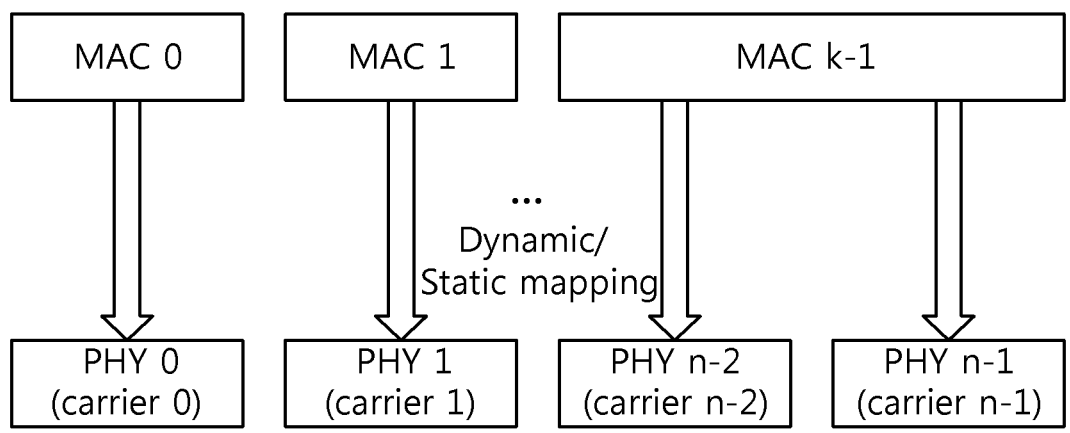
FIG. 12 is a view showing another example of a transmitter in which multiple MACs manage multiple carriers.
Figure 13:
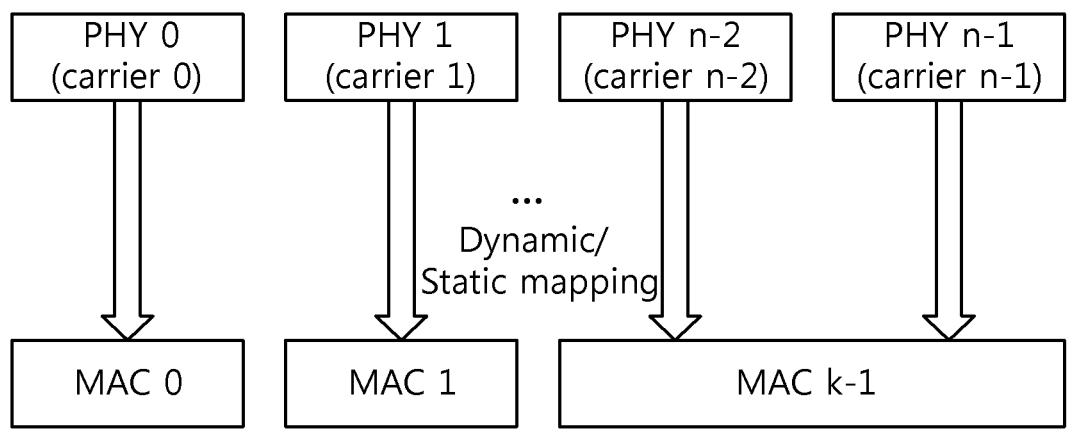
FIG. 13 is a view showing another example of a receiver in which multiple MACs manage multiple carriers.

FIG. 12 is a view showing another example of a transmitter in which multiple MACs manage multiple carriers, and FIG. 13 is a view showing another example of a receiver in which multiple MACs manage multiple carriers. Unlike the embodiments of FIGS. 10 and 11, a total number k of MACs and a total number n of physical layers are different. Some MACs (MAC 0, MAC 1) are mapped to physical layers (PHY 0, PHY 1) in a one-to-one manner, and a MAC(MAC k−1) is mapped to a plurality of physical layers (PHY n−2, PHY n−2).

Each component carrier may support different RATs (Radio Access Technologies). For example, a first component carrier may support 3GPP LTE, a second component carrier supports IEEE 802.16m, and a third component carrier supports GSM (Global System for Mobile Communications).

For clarification, hereinafter, transmission of a pair of PDCCH-PDSCH in downlink carrier is considered, but a skilled person in the art would easily apply it also to a pair of PDCCH-PUSCH.

The structure of a channel in the multi-carrier system will now be described.

Figure 14:
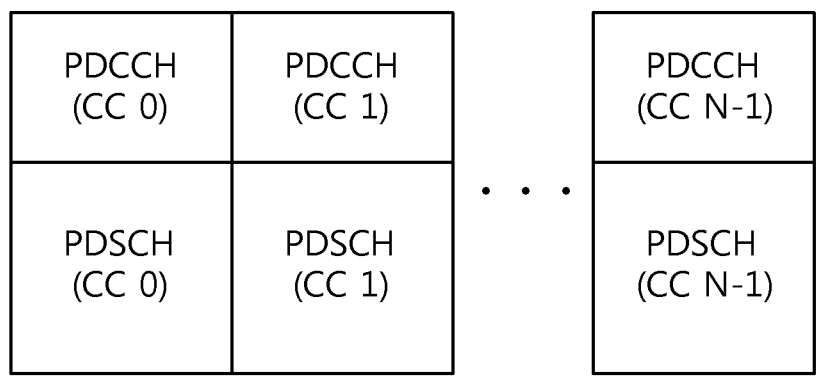
FIG. 14 is a view showing an example of a channel structure.

FIG. 14 is a view showing an example of a channel structure. N is the number of component carriers. Various settings and control information 9 carrier dependent information and/or carrier-specific information) required for each of the component carriers are transmitted by each component carrier. The PDCCH and the PDSCH are independently managed by component carrier.

Figure 15:
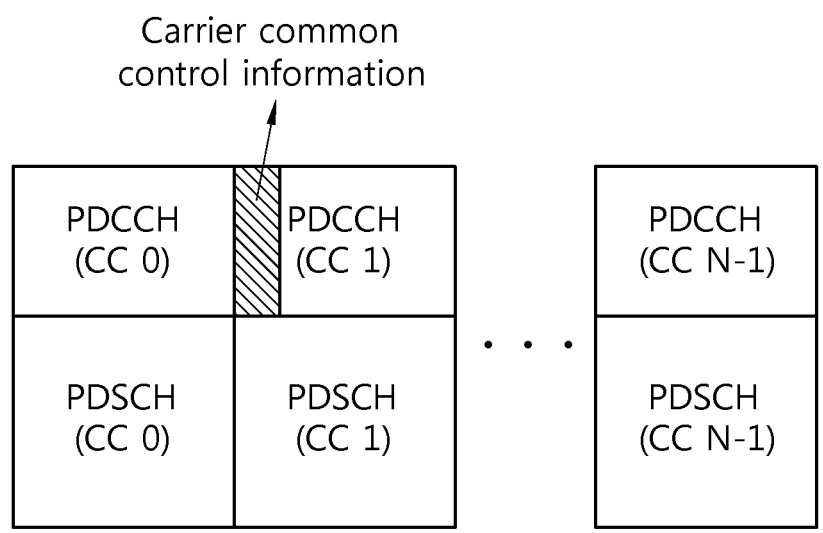
FIG. 15 is a view showing another example of a channel structure.

FIG. 15 is a view showing another example of a channel structure. Carrier common control information is transmitted through one or a plurality of component carriers. The carrier common control information may include a coordination field (to be described).

Figure 16:
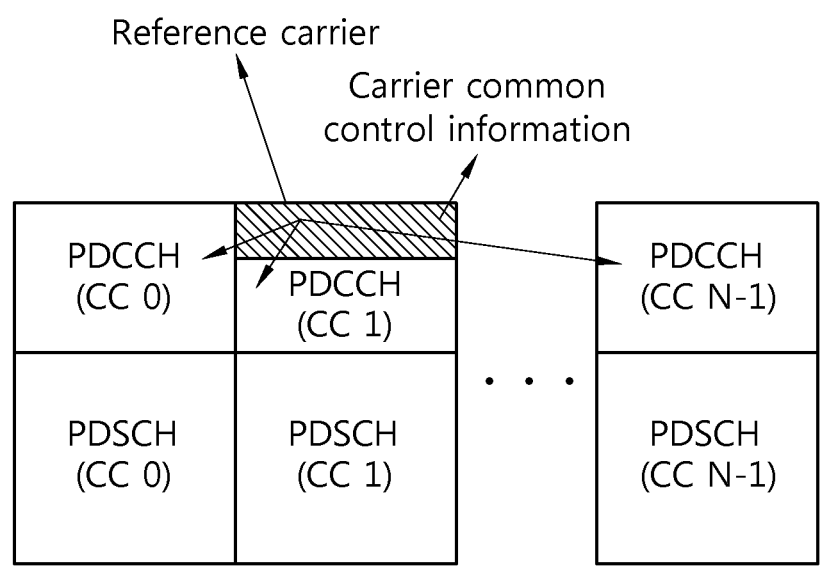
FIG. 16 is a view showing another example of a channel structure.

FIG. 16 is a view showing another example of a channel structure. Compared with the example of FIG. 15, at least one of a plurality of component carriers is set as a reference carrier. Carrier common control information is transmitted through the reference carrier. The Carrier common control information may include a coordination field, and setting and managing of the reference carrier will be described later.

Figure 17:
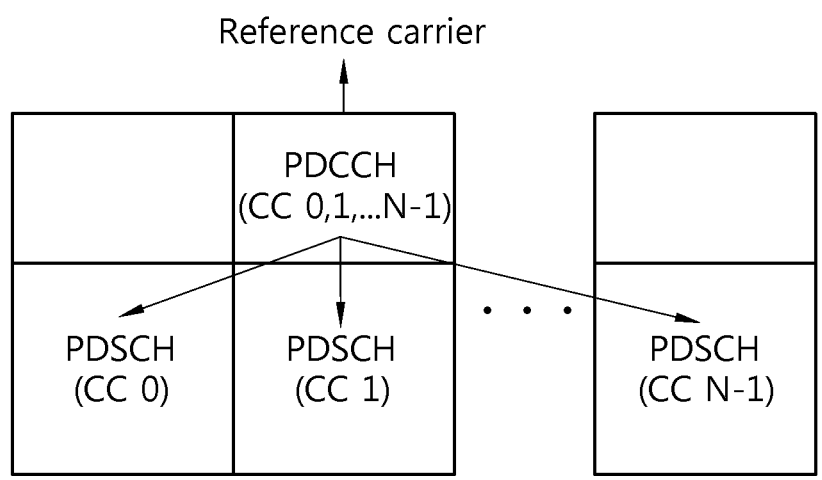
FIG. 17 is a view showing another example of a channel structure.

FIG. 17 is a view showing another example of a channel structure.

Compared with the example of FIG. 16, the PDCCH is transmitted through a reference carrier. The PDCCH in the examples of FIGS. 14 to 16 is separate-coded, the PDCCH in FIG. 17 is joint-coded. The separate coding refers to that one PDCCH can carry a downlink allocation for the PDSCH with respect to one component carrier. The joint-coding refers to that one PDCCH can carry a downlink allocation for the PDSCHs of one or more component carriers.

The joint-coding may be divided into partial joint coding and full joint coding. The full joint coding is coding DCI such that one PDCCH carries a resource allocation with respect to PDSCHs of the entire component carriers, and the partial joint coding is coding DCI such that one PDCCH carries a resource allocation with respect to PDSCHs of some of the entire component carriers. The partial joint coding may be used together with the separate coding.

Figure 18:
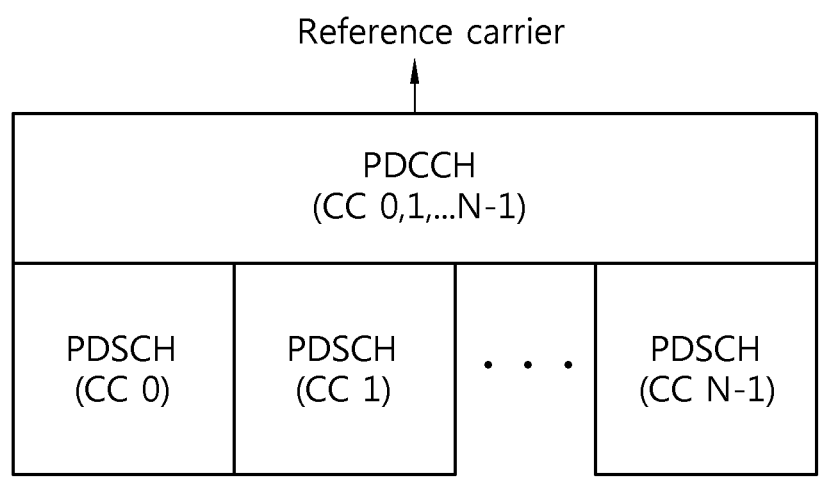
FIG. 18 is a view showing another example of a channel structure.

FIG. 18 is a view showing another example of a channel structure. In comparison with the example of FIG. 17, a PDCCH is joint-coded over a plurality of component carriers.

According to the structure (the structure of separate coding) illustrated in FIGS. 14 to 16, each carrier can transmit and receive a control channel and a data channel, and the control channel structure of the existing 3GPP LTE defined for each carrier can be advantageously maintained substantially as it is. Carrier-specific control information is transmitted through each component carrier, so overhead of a control channel is determined by a scheduled component carrier. Since HARQ is performed by each carrier, a transport block can be prevented from being overly enlarged in case of retransmission.

According to the structure (the structure of the joint coding) illustrated in FIGS. 17 and 18, since control information must be fixed to its maximum level regardless of a scheduled carrier, a control channel of a new format different from that of the existing system is required. However, when the pair of PDCCH and PDSCH are transmitted only through a component carrier maintaining compatibility with LTE, backward compatibility can be maintained.

Figure 19:
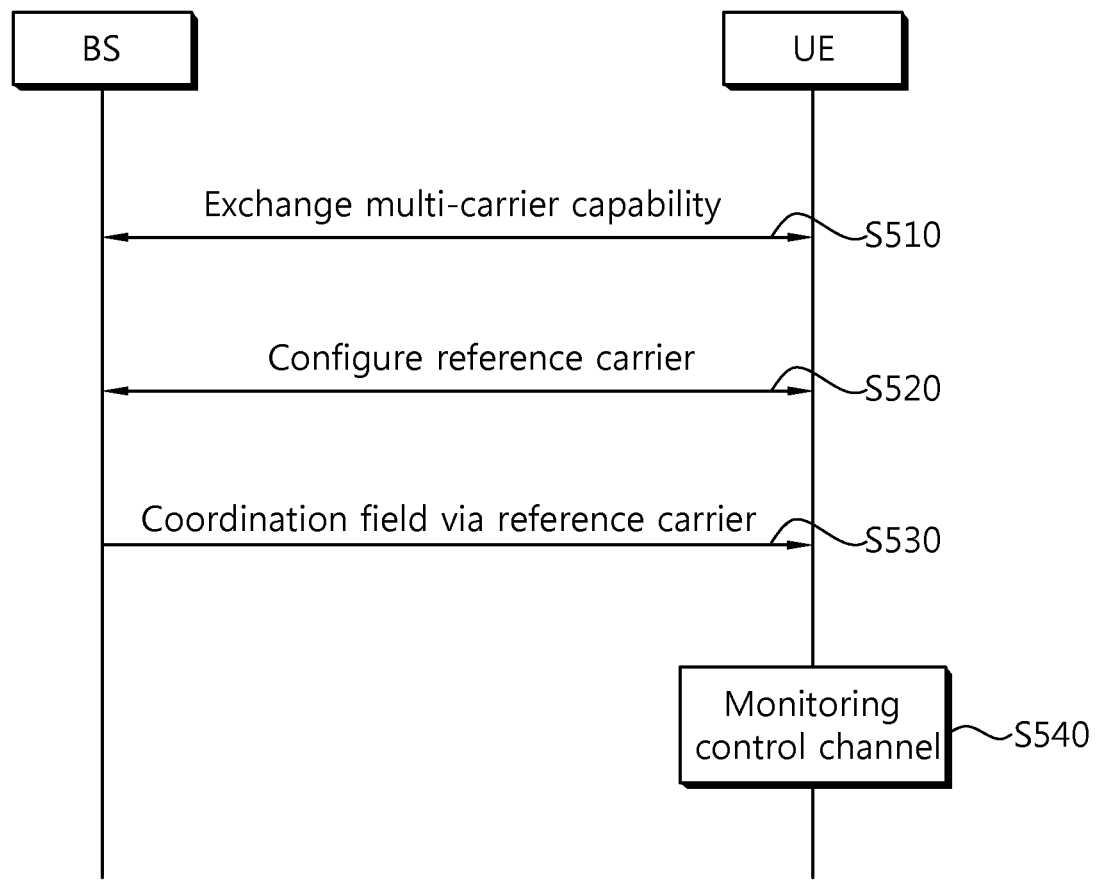
FIG. 19 is a view showing a method for managing multiple carriers according to an embodiment of the present invention.

FIG. 19 is a view showing a method for managing multiple carriers according to an embodiment of the present invention.

A BS and a UE exchange multi-carrier capability (S510). The multi-carrier capability may include whether or not multiple carriers are supported, the number of multiple carriers supported by the BS and the UE, and the like.

The BS and the UE configures a reference carrier (S520). The configuration of the reference carrier will be described later.

The BS transmits a coordination field to the UE through the reference carrier (S530). The coordination field may include information regarding a management of multiple carriers. Specifically, the coordination field may include information for PDCCH monitoring in multiple carriers.

The UE monitors a control channel for multiple carriers based on information included in the coordination field (S540).

An allocation of a reference carrier will now be described. A reference carrier is also called a primary carrier or an anchor carrier.

The reference carrier is a downlink component carrier transmitting at least one of system information, common carrier control information, carrier allocation information, and carrier control information. Or, the reference carrier may be an uplink component carrier transmitting uplink control information or a scheduling request.

A component carrier set as the reference carrier among a plurality of component carriers may be defined permanently or semi-statically through higher layer signaling.

Among a plurality of component carriers, a component carrier whose center frequency is highest or lowest may be set as a reference frequency. Or, among the plurality of component carriers, a component carrier whose index is the largest or smallest may be set as a reference carrier.

The reference carrier may be allocated to be cell-specific, UE-specific, UE group-specific, or service-specific.

(1) Cell-Specific Reference Carrier Assignment

The reference carrier is set to be cell-specific by cell. The reference carrier may be set based on cell-specific information (e.g., a cell ID), information unique for each cell.

For example, index I of a component carrier used as the reference carrier may be defined as expressed by Equation 1 shown below:

$$I = (Cid \bmod N) \qquad [\text{Equation 1}]$$

where Cid is a cell ID, and N is the number of component carriers. N may indicate the number of entire component carriers or may indicate the number of candidate component carriers which may become a reference carrier.

The reference carrier may fixedly set in a cell by using a particular parameter such as a cell ID. Or, a reference carrier may be semi-statically set through measurement results. For example, the BS may recognize a channel state of the component carrier currently used as a reference carrier from the measurement results (e.g., an interference level, a CQI (channel quality indicator, or the like) reported by UEs within the cell. When the channel state becomes worse, the BS may re-set a different component carrier as a reference carrier.

(2) UE-Specific Reference Carrier Assignment

A reference carrier may be set for each UE. The reference carrier is set based on UE-specific information, information unique to each UE. The UE-specific information may include a UE ID (e.g., a C-RNTI of 3GPP LTE), a unique ID of a UE.

For example, index I of a component carrier used as a reference carrier may be defined as expressed by Equation 2 shown below:

$$I = (Uid \bmod N) \qquad [\text{Equation 2}]$$

where Uid is a UE ID, and N is the number of component carriers. N may indicate the number of entire component carriers or may indicate the number of candidate component carriers which may become a reference carrier.

The reference carrier may fixedly set in a cell by using a particular parameter such as a UE ID. Or, a reference carrier may be semi-statically set through measurement results. For example, the BS may recognize a channel state of the component carrier currently used as a reference carrier from the measurement results (e.g., an interference level, a CQI (channel quality indicator, or the like) reported by UEs within the cell. When the channel state becomes worse, the BS may re-set a different component carrier as a reference carrier.

(3) UE Group-Specific Reference Carrier Assignment

UEs may be divided into one or more UE groups by layer such as a UE category or QoS (Quality of Service) within a cell. A reference carrier may be set for each UE group. A reference carrier is set based on UE group-specific information, information unique to each UE group. The UE group-specific information may include a group ID, a unique ID of a UE group, and/or a UE category index.

For example, index I of a component carrier used as a reference carrier may be defined as expressed by Equation 3 shown below:

$$I = (Gid \bmod N) \qquad [\text{Equation 3}]$$

where Gid is a UE group ID or a UE category index, and N may indicate the number of entire component carriers or may indicate the number of candidate component carriers which may become a reference carrier.

The reference carrier may fixedly set in a cell by using a UE group-specific parameter such as a UE group ID. Or, the reference carrier may be semi-statically set through measurement results. For example, the BS may recognize a channel state of the component carrier currently used as a reference carrier from the measurement results (e.g., an interference level, a CQI (channel quality indicator, or the like) reported by UEs within the cell. When the channel state becomes worse, the BS may re-set a different component carrier as a reference carrier.

(4) Service-Specific Reference Carrier Assignment

A reference carrier may be set to be service-specific by UE/UE group/cell. For example, a reference carrier may be set by service used by UEs or by QoS required for each service, so a plurality of reference carriers are set for a single UE.

For example, it is assumed that required service types are divided into real-time traffic, low latency, best effort, backward compatibility, and/or mobility management. The BS may configure a sub-set of candidate carriers according to each service type, and set one of carriers belonging to the sub-set corresponding to a service type, as a reference carrier with respect to the service type.

The service-specific reference carrier may be semi-statically set through the measurement results. For example, the BS may recognize a channel state of the component carrier currently used as a reference carrier from the measurement results (e.g., an interference level, a CQI (channel quality indicator, or the like) reported by UEs within the cell. When the channel state becomes worse, failing to guarantee requested QoS, the BS may re-set a different component carrier as a reference carrier.

The reference carrier may be set according to a scheduling scheme. For example, a reference carrier to which semi-persistent scheduling, such as VoIP, is applied and a reference carrier to which dynamic scheduling is applied may be set, respectively.

The coordination field will now be described.

The coordination field may be transmitted through a reference carrier, or may be transmitted through a separately defined carrier. Coordination information may be transmitted through system information or higher layer signaling, or may be transmitted in every subframe. The coordination information may be included in DCI.

The coordination field includes control information supporting multiple carriers. The coordination field includes multi-carrier related information it can support for a UE. For example, the coordination field may include index of a component carrier for monitoring PDCCH by each UE, PDCCH monitoring information, or the like, The coordination field may include information regarding a blind decoding zone for PDCCH monitoring. The information regarding the blind decoding zone may include at least one of the followings: (1) the index of a component carrier in which the UE monitors a PDCCH, (2) a CCE aggregation level used for blind decoding in a particular carrier or the entire carriers, (3) the number of candidate PDCCHs used for blind decoding in a particular carrier or the entire carriers, (4) information regarding a subframe in which PDCCH is to be monitored in a particular carrier or the entire carriers, e.g., the period, number, and/or indexes of subframes to be monitored, (5) The size of a control region within a subframe in a particular carrier or the entire carriers, e.g., the number of OFDM symbols used in the control region within the subframe.

In the multi-carrier system, it is assumed that each component carrier can independently perform scheduling. Here, when each component carrier performs blind decoding to monitor a PDCCH, battery consumption would be increased. However, when each carrier can independently perform scheduling, the BS is not required to transmit the PDCCH of the UE through every component carrier. Thus, in order to reduce complexity of blind decoding and battery consumption, the BS provides information regarding the blind decoding zone to the UE.

The coordination field may include a size of the control region which is similar to that of the existing PCFICH. As well known, the PCFICH is a channel transmitted on a first OFDM symbol, informing that how may OFDM symbols the region in which the PDCCH is transmitted in each subframe uses. Each UE first decodes the PCFICH to recognize to which number of OFDM symbols the UE can perform blind decoding. However, in the multi-carrier system, when each component carrier transmits the PCFICH, overhead may be generated. In addition, like the example of FIG. 17, when the PDCCH is transmitted through a particular carrier, the PCFICH is not necessary for a component carrier in which the PDCCH is not transmitted. Thus, whether or not a PDCCH of a different component carrier is to be monitored or the size of the control region are transmitted through the reference carrier, to inform the UE that which component carrier is to be PDCCH-monitored and/or the size of a region in which the PDCCH is to be monitored.

The information regarding the blind decoding zone is transmitted through the reference carrier. At this time, the information regarding the blind decoding zone may include information regarding a designation of a component carrier performing blind decoding among the other remaining component carriers than a component carrier used as a reference carrier and/or monitoring information in the corresponding component carrier. Also, the information regarding the blind decoding zone may include monitoring information in the reference carrier.

The monitoring information is information for reducing the burden of PDCCH blind decoding and may include at least any one of a configuration of the PDCCH, the position on a CCE stream, a CCE aggregation level in a search space, the number of candidate PDCCHs at each CCE aggregation level, and/or a starting point of the search space (common search space and/or UE-specific search space).

Figure 20:
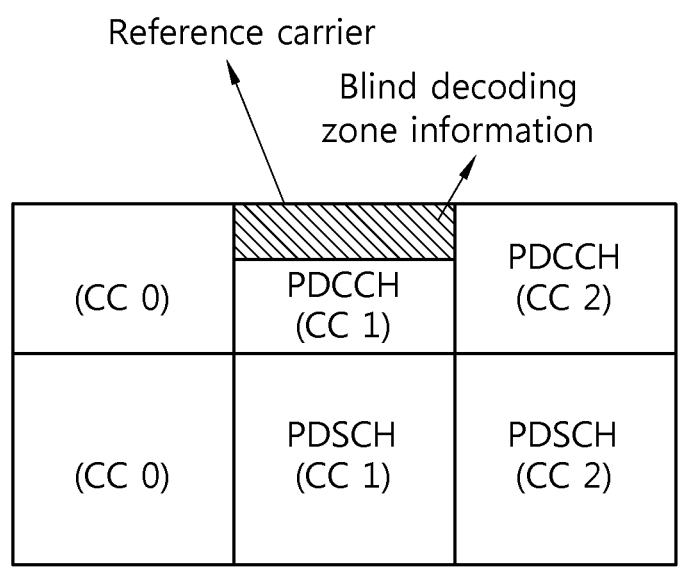
FIG. 20 is a view showing an example of transmitting control information.

FIG. 20 is a view showing an example of transmitting control information. The information regarding the blind decoding zone is transmitted through a second component carrier CC1, a reference carrier. Here, the PDSCH is not scheduled in a first component carrier CC0, blind decoding is turned 'OFF'.

Table 1 below shows an example of the information regarding the blind decoding zone

TABLE 1

| Component carrier | Whether to perform blind decoding | Monitoring information |
| --- | --- | --- |
| CC 0 | OFF | NONE |
| CC 2 | ON | YES |

In addition to Table 1, the size of a control region of a third component carrier CC2 and monitoring information in a reference carrier may be further included in the information regarding the blind decoding zone.

In another example of the coordination field, the coordination field may include indication information discriminating a transmission of a legacy PDCCH and a new PDCCH. The legacy PDCCH refers to a PDCCH of the existing 3GPP LTE. The LTE-A system, an evolution of LTE, which is currently being developed, adopts new technologies such as relay, downlink 8 Tx MIMO, uplink MIMO, CoMP (Coordinated Multipoint Transmission), or the like. When there is a new format of PDCCH for supporting a new technology, there is a need to discriminate resource regions in which the legacy PDCCH and the new PDCCH are transmitted. For example, like the PCFICH indicates the number of OFDM symbols in which the legacy PDCCH is transmitted in a subframe, the coordination field may include at least any one of the number of OFDM symbols in which the new PDCCH is transmitted in the LTE-A subframe, the number or position of RBs (resource blocks) in which the new PDCCH is transmitted, and the position of a frequency domain.

The coordination field may indicate PHICH resource for an LTE-A UE. Here, the PHICH resource may use existing CCE resource or resource other than control channel resource.

The coordination field including the information for LTE-A may be transmitted through a component carrier for LTE-A.

A transmission of the coordination field will now be described.

The coordination field may be transmitted through the PDCCH. The existing DCI format maybe re-used or a new DCI format may be defined for the coordination field. The coordination field may use a CCD aggregation level of {1, 2, 4, 8} or any other CCE aggregation level. The LTE UE may perform blind decoding on a basic CCD aggregation level. Since a CRC error will occur with respect to the coordination field, compatibility is guaranteed.

The PDCCH for the coordination field may be limited to use a relatively large CCE aggregation level to guarantee reliability. For example, the PDCCH for the coordination field may use 4 or 8 CCE aggregation level among {1, 2, 4, 8} or may use a CCD aggregation level larger than 8.

A UE ID may be masked on a CRC of a DCI format for the coordination field. Or, a new ID may be defined for masking the coordination field. Or, masking may be not be used for the coordination field.

A new control channel may be designed to transmit the coordination field. It is assumed that it is called a coordination control channel. Like the existing PCFICH, the coordination control channel may be mapped to resource to have uniform intervals in the frequency axis in OFDM symbols within a subframe, to thus obtain frequency diversity. When the coordination field is transmitted through the coordination control channel, efficiency of the blind decoding of the LTE-A UE can be enhanced. Like the LTE UE first decodes the PCFICH and then decodes the PDCCH by using the corresponding information, the LTE-A UE first decodes the coordination control channel in which the coordination field is transmitted, and then decodes the PDCCH by using the corresponding information.

In order for the LTE-A UE to preferentially detect the coordination field, the position of the coordination control channel may be fixed within a subframe. For example, the CCEs used by the coordination control channel are positioned at the foremost within each subframe, whereby the LTE-A UEs can first decode the coordination control channel to obtain general information regarding multi-carrier support. Or, a coordination search space for searching for a coordination control channel may be designated on a logical CCE stream. A starting point of the coordination search space may be fixed at a position in front of a different search space. The starting point of the coordination search space may be fixed at an end position compared with a different search space.

When the coordination field is defined in a DCI format or when it is transmitted through the coordination control channel, a cyclic shift may be applicable cell-specifically by using cell-specific information such as a cell ID.

The coordination field may be transmitted through higher layer signaling such as an RRC message.

The foregoing various embodiments may be independently used or may be combined to be used. Or, the foregoing various embodiments may be selectively applied according to a situation.

Figure 21:
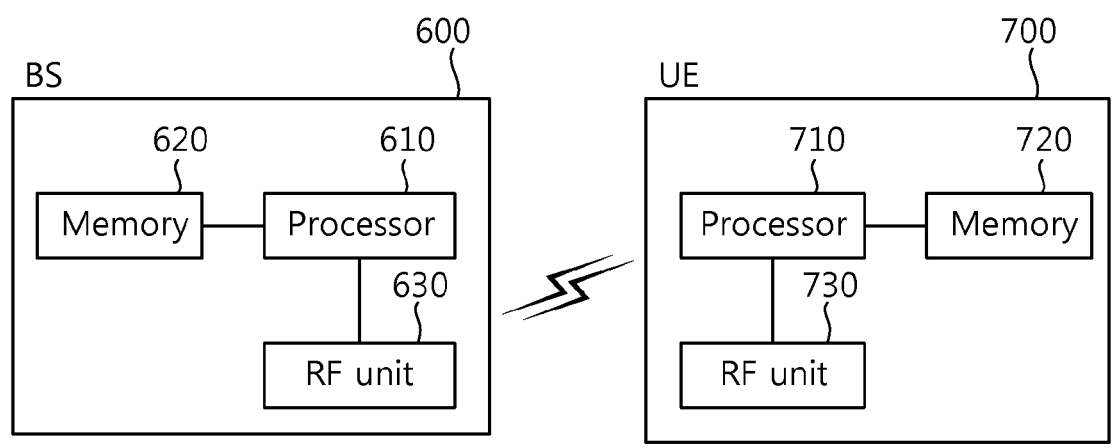
FIG. 21 is a schematic block diagram showing a wireless communication system implementing an embodiment of the present invention.

FIG. 21 is a schematic block diagram showing a wireless communication system implementing an embodiment of the present invention.

A BS 600 includes a processor 610, a memory 620, and an RF (radio frequency) unit 630.

The processor 610 implements the proposed functions, processes and/or methods. The layers of a radio interface protocol may be implemented by the processor 610. The processor 610 may manage multiple carriers and configure a coordination field.

The memory 620, connected to the processor 610, stores protocols or parameters for managing multiple carriers. The RF unit 630, connected to the processor 610, transmits and/or receives a radio signal.

The UE 700 includes a processor 710, a memory 720, and an RF (radio frequency) unit 730.

The processor 710 implements the proposed functions, processes and/or methods. The layers of a radio interface protocol may be implemented by the processor 710. The processor 710 may manage multiple carriers and monitor a control channel on multiple carriers based on a coordination field.

The memory 720, connected to the processor 710, stores protocols or parameters for managing multiple carriers. The RF unit 730, connected to the processor 710, transmits and/or receives a radio signal.

The processors 610 and 710 may include an ASIC (application-specific integrated circuit), a different chip-set, a logical circuit and/or a data processing device. The memories 620 and 720 may include ROM (read-only memory), RAM (random access memory), a flash memory, a memory card, a storage medium and/or a different storage device. The RF units 630 and 730 may include a baseband circuit for processing a radio signal. When an embodiment is implemented by software, the foregoing schemes may be implemented by modules (processes, functions, etc.) for performing the foregoing functions. The memories 620 and 720 may exist within or outside of the processors 610 and 710 and may be connected to the processors 610 and 710 through various well-known units.

In the exemplary system as described above, the methods are described based on the flow chart by sequential steps or blocks, but the present invention is not limited to the order of the steps, and a step may be performed in different order from another step as described above or simultaneously performed. It would be understood by a skilled person in the art that the steps are not exclusive, a different step may be included, or one or more of the steps of the flow chart may be deleted without affecting the scope of the present invention.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

The invention claimed is:

1. A method for monitoring a control channel in a multi-carrier system, the method comprising:
   transmitting capability information including information on whether or not a plurality of component carriers are aggregated and information on the number of the plurality of component carriers to be supported;
   receiving a configuration of a plurality of reference carriers among the plurality of component carriers, each of the plurality of component carriers being receivable of a downlink channel and the control channel,
   wherein each of the reference carriers is configured per each of at least one service,
   wherein the each reference carrier is configured based on a type of the at least one service, and
   wherein types of service include real-time traffic, low latency, best effort, and backward compatibility and mobility management;
   receiving blind decoding zone information on the reference carrier to monitor the control channel on the plurality of component carriers; and
   monitoring the control channel based on the blind decoding zone information.

2. The method of claim 1, wherein the blind decoding zone information includes information regarding a monitored component carrier for monitoring the control channel among the plurality of component carriers.

3. The method of claim 2, wherein the blind decoding zone information includes monitoring information for performing blind decoding on the monitored component carrier.

4. The method of claim 3, wherein the monitoring information includes at least any one of a control channel elements (CCE) aggregation level in a search space, the number of candidate physical downlink control channels (PDCCHs) at each CCE aggregation level, and a starting point of the search space.

5. The method of claim 3, wherein the monitoring information further includes information for performing blind decoding in the reference carrier.

6. The method of claim 1, wherein the blind decoding zone information includes information regarding an area in which the control channel is monitored within a subframe.

7. The method of claim 6, wherein the blind decoding zone information includes information regarding the size of the area in which the control channel is monitored within the subframe.

8. The method of claim 1, wherein the blind decoding zone information is transmitted by using a predetermined resource within the subframe.

9. The method of claim 1, wherein the blind decoding zone information is received by using blind decoding.

10. The method of claim 1, wherein the plurality of component carriers are managed by one medium access control (MAC) entity.

11. The method of claim 1, wherein the plurality of component carriers are managed by plural medium access control (MAC) entities.

12. The method of claim 1, wherein the aggregation of the plurality of component carriers is supported up to 100 Mhz.

13. The method of claim 1, wherein the each reference carrier is configured based on a quality of service (QoS) required by each service.

14. The method of claim 1, wherein the each reference carrier is configured by being selected from among reference carrier candidates for supporting a type of the service.

15. A user equipment (UE) for monitoring a control channel in a multi-carrier system, the UE comprising:
a radio frequency (RF) unit configured to transmit and receive a radio signal; and
a processor configured to: transmit capability information including information on whether or not a plurality of component carriers are aggregated and information on the number of the plurality of component carriers to be supported;
receive a configuration of a plurality of reference carriers among the plurality of component carriers, each of the plurality of component carriers being receivable of a downlink channel and the control channel,
wherein each of the reference carriers is configured per each of at least one service,
wherein the each reference carrier is configured based on a type of the at least one service, and
wherein types of service include real-time traffic, low latency, best effort, and backward compatibility and mobility management;
receive blind decoding zone information on the reference carrier to monitor the control channel on the plurality of component carriers; and
monitor the control channel based on the blind decoding zone information.

16. The UE of claim 15, wherein the blind decoding zone information includes information regarding a monitored component carrier for monitoring the control channel among the plurality of component carriers.

17. The UE of claim 16, wherein the blind decoding zone information includes monitoring information for performing blind decoding on the monitored component carrier.

18. The UE of claim 17, wherein the monitoring information includes at least any one of a control channel elements (CCE) aggregation level in a search space, the number of candidate physical downlink control channels (PDCCHs) at each CCE aggregation level, and a starting point of the search space.

* * * * *